United States Patent [19]
Farman

[11] 3,844,045
[45] Oct. 29, 1974

[54] FLUIDIC PRECISE POSITION INDICATOR

[76] Inventor: Freeman K. Farman, 351 Whitenack Rd., Far Hills, N.J. 07931

[22] Filed: June 8, 1972

[21] Appl. No.: 261,097

[52] U.S. Cl. ............ 33/125 R, 33/172 R, 33/172 C
[51] Int. Cl. ...................... G01b 19/64, G01b 13/02
[58] Field of Search .......... 33/172 C, 147 C, 172 R, 33/125 R

[56] References Cited
UNITED STATES PATENTS
2,458,344   1/1949   Carroll .............................. 33/125 R
3,320,673   5/1967   Larson .............................. 33/147 C FOREIGN PATENTS OR APPLICATIONS
967,247   10/1950   France .............................. 33/172 C
926,151   4/1947   France .............................. 33/172 C Primary Examiner—Louis R. Prince
Assistant Examiner—Richard R. Stearns
Attorney, Agent, or Firm—Armstrong, Nikaido & Wegner

[57] ABSTRACT

A fluidic device in the form of a precise position indicator for indicating at a remote and separate location the precise travel of a tool, a table, a grinding wheel or other variable in relation to other stationary elements of a machine and including, e.g., with conventional lathe parts, a tool slide means and a stationary slide means, an actuating rod element secured to the tool slide means by a clamping means such that the actuating rod element moves forward simultaneously with said tool, and actuating means adjustably secured to said rod in contacting engagement with a piston for depression of an actuating cylinder to displace hydraulic fluid through a tube into a zeroing cylinder and through a connecting tube into a slave cylinder, forcing a piston rod into the base of a dial indicator adaptor means connected to the slave cylinder to produce a read off on a dial indicator affixed to the adaptor means.

8 Claims, 1 Drawing Figure

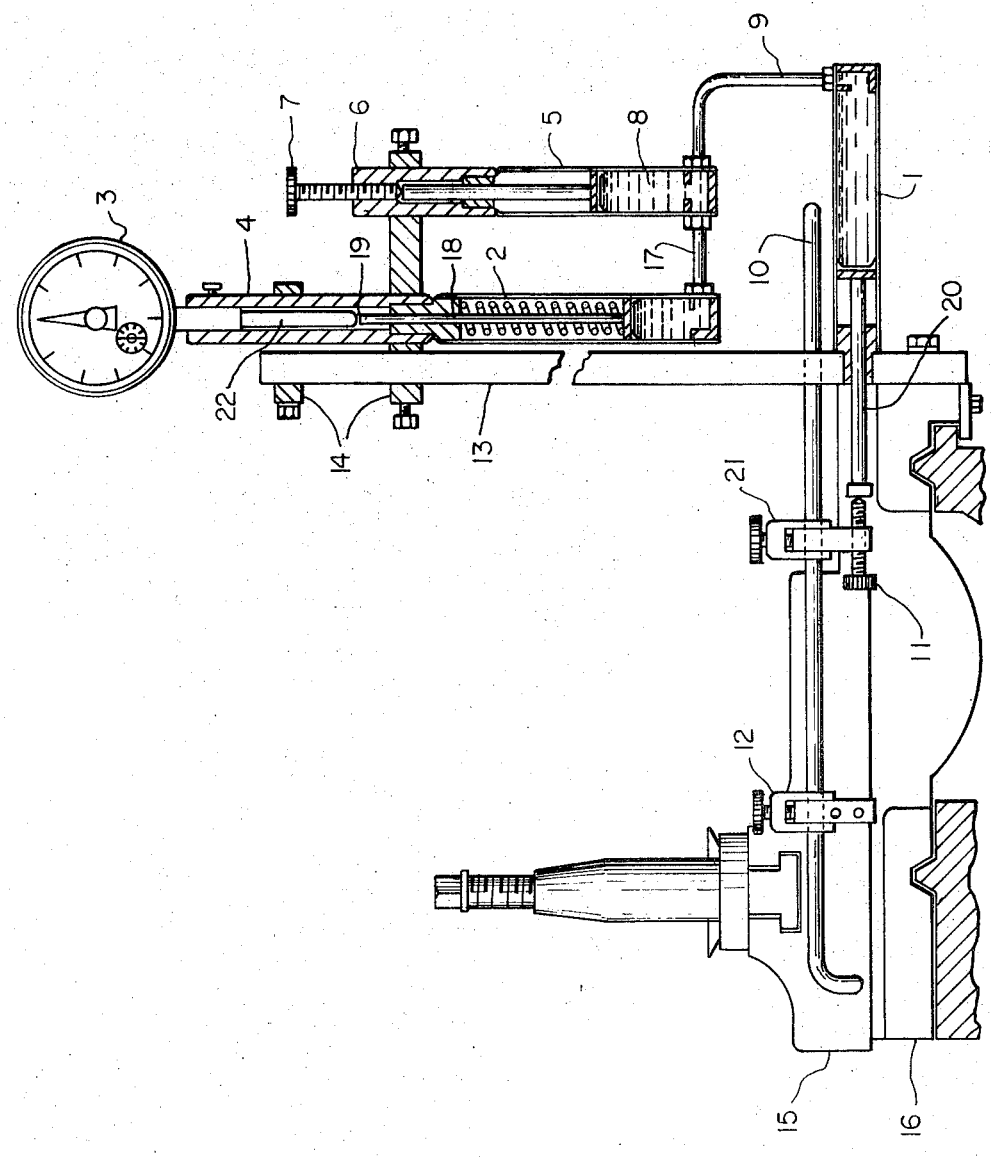

FLUIDIC PRECISE POSITION INDICATOR

BACKGROUND OF THE INVENTION

The present invention relates to a fluidic precise position indicator which is a device intended to reveal on a remotely located indicator, the precise movement of a variable or moving element of a machine relative to a stationary element and particularly the movement of a tool, a table, a grinding wheel or the like.

In the past, production workers in plants and individuals employing various types of machinery such as grinding wheels, lathes, milling machines, boring mills, planers and drafting and layout mechanisms and the like, all of which involve one or another type of work piece or material involving repeated operations, often identical in character, or identical and repeated operations on different work pieces, have resorted to measuring each work piece several times, or aligning each operation individually to insure consistency and accuracy as to each different work piece or the several repeated applications of an identical operation on a given work piece. Such techniques cause considerable delay and lack accuracy to any true degree.

Attempts to remedy the defects and drawbacks of past techniques include the mounting on a machine of a hydraulic cylinder coupled to a manometer tube mounted at a remote location and positioned so as to be easily readable by the operator and for indicating the position of the variable element of the machine. This arrangement might be acceptable if certain conditions were fulfilled. These conditions include the fact that the manometer tube would have to be of a precisely uniform bore. Also, the bore would have to have a precise relationship to the hydraulic cylinder and the tube would have to be clearly and precisely graduated throughout its entire length so it would read in one-one thousandths (1/1000) of an inch. Finally, the manometer tube would have to be quite long in order to achieve the required resolution. All of these conditions are expensive specifications and requirements to overcome and, even if met, do not produce the exact precision and accuracy necessary. Moreover, in larger machinery and jobs the manometer tube length reaches unworkable size and can even interfere with the operation of the device.

The primary object of the present invention is to provide a device which overcomes the problems and deficiencies associated with past manual procedures and crude devices related to the present circumstance involving the preparation of identical work pieces by the repeated operations of a machine or the repetition of a given machine operation on the same work piece.

Another object of my invention is to provide a fluidic precise position indicator device which includes an actuating means connected to a piston in an actuating cylinder whereby an amount of fluid, based upon the movement of the actuating means, is forced through conveying means into a hydraulic zeroing cylinder for operation thereof and through a connecting means to a hydraulic slave cylinder thus operating a piston, adaptor and dial indicator to reveal the exact and precise distance of movement of the variable or movable element in a machine relative to a stationary element.

Another object of my invention is to provide a fluidic precise position indicator device which is simple and inexpensive of construction and operation and which is not prone to fall into disrepair and which has a dial indicator capable of calibration in thousandths of an inch (0.001) or ten thousandths of an inch (0.0001) as may be desired or required by the accuracy of the given work to be performed and capable of measuring precisely the movement of the variable element on the machine relative to the stationary element and accurately depicting that movement on the indicator even after the device has become worn after long and continuous use.

A still further object of my invention is to provide a fluidic precise position indicator device which is adaptable to and capable of mounting and use with a variety of machines involving a variety of operations and including, but not limited to, lathes, grinders, milling machines, boring mills, planers, machine tools and production machines, drafting and layout devices and the like.

Yet another object of my invention is to provide a device of the class indicated which is capable of the functions referred to and which is based upon the principles of hydraulic amplification and wherein a long actuating cylinder of small bore may be combined with a short slave cylinder of precisely 10 times the bore size of the actuating cylinder or other suitable ratio, all attached to an indicator means to reveal precisely the effective relative movement of the machine elements.

Other objects will appear hereinafter.

SUMMARY OF THE INVENTION

In accordance with the present invention, a device in the form of a fluidic precise position indicator operates upon the principles of hydraulic amplification and as constructed is mounted upon any of the well-known machines and devices for operating upon work pieces and has as its components generally, an actuating member secured to the machine, and operable to an actuating cylinder by means of a piston rod to force fluid from the actuating cylinder through a conveying means to a first hydraulic cylinder and hence by connecting means to a second hydraulic cylinder with an adaptor and forcing a piston rod in the second hydraylic cylinder to progressively pass through a bore in the adaptor to contact a dial indicator. Also included are mounting means in general and the first hydraulic cylinder may be equipped with an adaptor and adjustable screw for adjusting a piston and piston rod therein.

BRIEF DESCRIPTION OF THE DRAWING

For a more complete understanding of my invention, reference will be made to the attached drawing figure forming a part of the present application. The drawing comprises a conventionalized showing in a front forward direct view of a machine with the device of my invention mounted thereon for operation and illustrating the features of my invention.

DETAILED DESCRIPTION OF THE DRAWING

Referring now to the FIGURE and to the details of the construction and operation of my invention, numerals 1 to 14 and 17–22 comprise the parts of the device. Numerals 15 and 16 merely depict a conventional lathe and it is understood that the device which is my invention is mountable on and operable with a variety of other machines, some of which have been identified hereinbefore. Specifically, 16 represents the stationary machine slide component of a conventional lathe and 15 represents the tool slide or movable element of the said conventional lathe. Secured to the tool slide 15 is the first element of the actuating means of the device which is actuating rod 10. The rod 10 is held secure to said tool slide 15 by actuating rod attachment means 12, such as a clamp. This structural arrangement results in the simultaneous forward movement of the rod 10 with the tool slide or movable element 15. The next element of the actuating means is actuating member 11 which may be in the form of a mechanical dog which is adjustably secured to the moving rod 10 by any suitable means 21, such as a clamp. The actuating member 11 is in engaging contact with piston 20 of actuating cylinder 1 which contains a suitable fluid substance such as any hydraulic fluid. Actuating cylinder 1 is connected to a first or hydraulic zeroing cylinder 5 by means of a hollow connecting member 9 such as hydraulic tubing. The cylinder 5 also has adaptor 6 and zeroing screw 7 which make it possible to hydraulically change the reading on indicator 3 so that the zero mark will plainly show the start or end of the desired travel of the movable or variable machine member. Zeroing cylinder 5 contains hydraulic or other fluid 8 and is connected to spring loaded hydraulic slave cylinder 2 by a hollow connecting means 17 such as a tube composed of any suitable material. Slave cylinder 2 contains therein a piston rod 18 which is movable within bore 19 of the dial indicator adaptor 4 affixed to said slave cylinder and which has attached thereto an indicator 3 such as a dial indicator with contact element 22 extending into bore 19 and adaptable for engagement with piston rod 18. The entire device is mounted on the machine by stationary support 13 and its support brackets 14. The entire arrangement is adjusted so that the indicator is located wherever it can be read most easily by the operator of the particular machine on which the device is mounted.

The operation and functioning of the device is as follows: The actuating means in general is secured to the movable or variable element of the machine and the device as a whole is mounted on the machine. The actuating member 11, which in the FIGURE is a mechanical dog, is adjusted to establish and engage the working range within that of indicator 3. The zeroing screw 7 in adaptor 6 of zeroing cylinder 5 is adjusted to hydraulically set a predetermined dial reading on the zero mark so that the precise travel distance will be revealed by the indicator 3. As the work piece is operated upon, the actuating rod 10 moves forward simultaneously with the movable or variable element of the machine, such as the tool slide shown in the FIGURE, to which the rod is secured by means 12. The movement causes the actuating member 11 to depress piston rod 20 with a piston thereon against the fluid in actuating cylinder 1 which, depending upon the distance traveled, expels a given amount of fluid from the actuating cylinder 1 through connecting means 9 into hydraulic zeroing cylinder 5, and depending upon the adjusted position of zeroing screw 7, a predetermined amount of fluid travels through connecting means 17 to a spring loaded, hydraulic slave cylinder 2 thus displacing pistons rod 18 a predetermined distance through bore 19 of indicator adaptor 4 against contact element 22 of indicator 3, such as a dial indicator, forcing said indicator to register the precise distance traveled by the movable or variable element of the machine, such as tool slide 15, relative to the stationary element. Upon return of the slide, the reverse action occurs and the operator, knowing the precise distance traveled, can repeat the operation on another work piece with full confidence that the precisely identical travel can be repeated.

Since the bore diameters of cylinders 1 and 2 are identical, the distance each has traveled is also identical. Accuracy is derived for two reasons. First, the graduations on the indicator are selected and prepared for clear and easy reading. Second, all backlash errors in the feed screw and other errors in the slide are completely bypassed. The device reads only the exact distance traveled by the slide, regardless of machine conditions. For this reason, the tool or other movable element can be moved back and forth with full confidence that a desired setting can be precisely repeated. Dial indicators are readily available with a basic measuring range of 6 inches. This would ordinarily limit this device to that travel. It is not true, however, in this case. The travel can be extended to 10 times the basic range by choosing a slave cylinder with piston area 10 times that of the actuating cylinder. The travel of the slave is now one tenth that of the actuator. To expand the dial reading and to read out in one-thousandths of an inch, (0.001) a stock indicator is substituted that reads in ten thousandths of an inch, (0.0001). Thus a long slender actuating cylinder is used, communicating to a short fat one to obtain up to sixty inches of precise measurement.

It is also possible to have a thousandth indicator and a ten thousandth indicator in the same system merely by immobilizing one mechanically while the other works. In this way roughing cuts can be taken with the less precise instrument and finishing cuts can be taken with the one reading to one ten thousandth.

The performance of the device is outstanding not only due to its own accuracy but because it bypasses the errors and inadequacies inherent in old, worn machines such as backlash and loss of pitch in leadscrews. The device monitors the absolute distance traveled by one machine element relative to another. The device is of indispensable assistance in such operations as internal boring and threading and in turning, shouldering and grooving to depth.

From the foregoing, it may be seen that I have provided a useful device for indicating the precise travel of a movable or variable machine element in relation to a stationary machine element in order to permit exact and precise repetition of a specific machine operation on a series of work pieces or repetition with regard to the same work piece.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fluidic precise position indicator comprising an actuating means including a first actuating element secured to the moving part of a machine by a first clamping means, and a second actuating element adjustably secured by a second clamping means to said first actuating element, wherein said second actuating element is located in contacting relationship with a piston rod of an actuating cylinder and is adapted for depressing said cylinder to expel a fluid into a means connecting said actuating cylinder with a hydraulic zeroing cylinder, and a means directly connecting said zeroing cylinder with a hydraulic slave cylinder with a piston and piston rod located therein and adapted for contacting engagement with an indicating means, wherein said slave cylinder piston engages a contact element of said indicating means in a direct line and wherein the first actuating element is a rod which is axially adjustable in the first clamping means and the second actuating element is a mechanical dog which is adjustable longitudinally with respect to the rod, and both clamping means are clamps.

2. The device according to claim 1, wherein there is located in the hydraulic zeroing cylinder, an adapter with a zeroing screw element for adjusting a piston rod and piston in said zeroing cylinder to provide a predetermined volume of fluid contained therein.

3. The device according to claim 2, wherein the hydraulic slave cylinder is spring loaded and the piston rod therein is surrounded by the spring.

4. The device according to claim 3, wherein an indicator adaptor with a bore in the center thereof is affixed to said slave cylinder and said piston rod of the slave cylinder is adapted to extend through said bore.

5. The device according to claim 4, wherein said indicating means is affixed to the indicator adaptor with a contacting element extending into said bore and adapted for contacting relation with the end of the slave cylinder piston rod and said indicating means is of a dial-type.

6. The device according to claim 5, wherein mounting means in the form of a support member and support brackets affix the device to a machine.

7. The device according to claim 6, wherein the bore diameters of the actuating cylinder and slave cylinder are identical.

8. The device according to claim 7, wherein the first and second clamping means are laterally displaced on the actuating rod.

* * * * *